Feb. 6, 1940. F. R. EICHNER 2,189,137
CONNECTOR STRIP
Filed Aug. 27, 1938
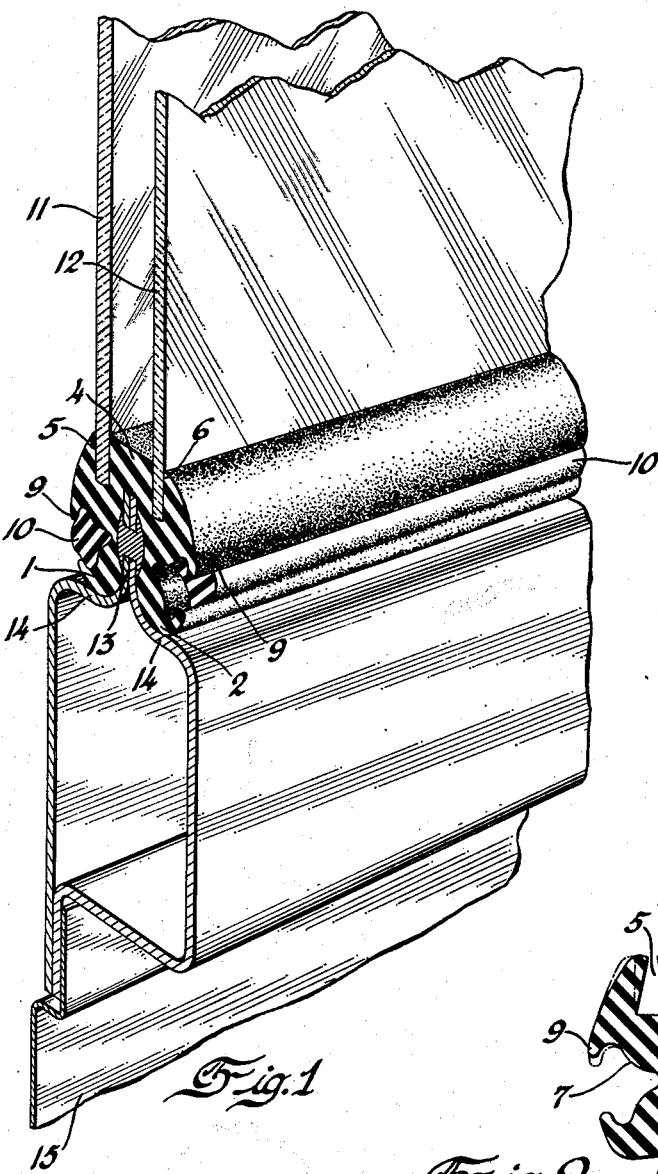
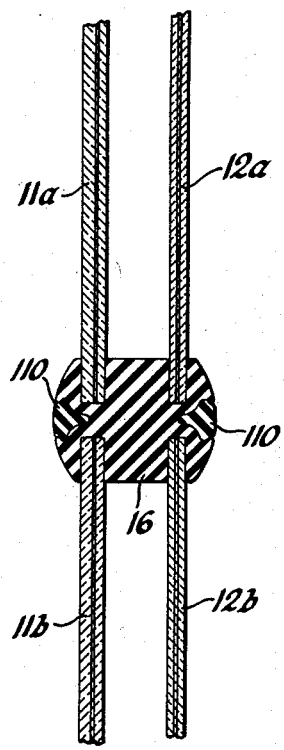
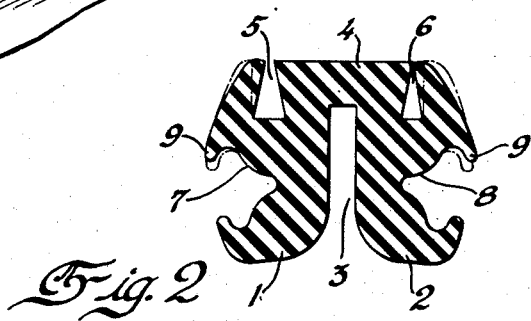
Inventor
Ferdinand R. Eichner
By Blackmore, Spencer & Flint
Attorneys Patented Feb. 6, 1940

2,189,137

UNITED STATES PATENT OFFICE 2,189,137

CONNECTOR STRIP

Ferdinand R. Eichner, Pontiac, Mich., assignor to Yellow Truck & Coach Manufacturing Company, Pontiac, Mich., a corporation of Maine Application August 27, 1938, Serial No. 227,097

10 Claims. (Cl. 20—56.5)

This invention relates to an improved connection especially adapted for use in a double window construction as a mounting of the glass in the window frame.

In a specific embodiment the invention involves the mounting of a pair of tandem window glasses in spaced channels on one face of a rubber strip which encircles the glasses and embraces within a channel on its opposite face a projecting edge of the window frame, there being in the sides of the strip expansible grooves to receive interlocking wedge fillers which place the rubber under compressive stress for tightly gripping and holding the parts against displacement. The assembly provides a weatherproof seal and a cushioned mounting which is inexpensive and easy to install and service without need for carefully fitted parts. The invention will be useful wherever double windows are an advantage as, for example, on air conditioned motor coaches and railway cars, the mounting being designed to insure a sealed air space between the windows for minimizing heat transfer, fogging or the collection of moisture on the glass and the like.

For a better understanding of the invention reference may be made to the accompanying drawing wherein Figure 1 is a perspective view showing a fragment of a double window installation with parts in section; Figure 2 is a detail sectional view of the mounting strip, and Figure 3 shows in section a mounting strip between two pairs of tandem panels or sheets.

The mounting strip illustrated may consist of rubber or other elastic deformable material, extruded or molded to the cross section illustrated in Figure 2. It may be supplied in a given length for a particular installation or it may come in long lengths to be cut to size at the time of installation. In cross section it can be considered to be of substantially U-shape with the space between the legs 1 and 2 providing a longitudinally extending groove 3 projected inwardly from the outer face of the strip to a depth sufficient to leave the connecting portion 4 between the legs at the inner face of the strip. Formed in the inner face in spaced relation on opposite sides of the channel 3 are the longitudinally extending window channels 5 and 6. These are of a depth to overlap slightly the bottom of the groove 3 and at their bottom are of a width substantially corresponding to the thickness of the windowpanes to be supported. Their side walls may be preformed as shown, in divergent relation to each other so that the fitting of the window glass therein stresses the material of the strip for a close or hugging contact with the window edges. Similarly the side walls of the groove 3 may be inclined relative to one another to restrict the entrance thereto in lieu of the parallel sided relation illustrated in Figure 2 and alternately the side walls of the grooves 5 and 6 could be parallel to one another without seriously affecting the final fit of the parts.

In the side of the leg 1 is located a V-shaped groove 7 to receive a wedging filler strip, the insertion of which expands the groove and places the material in the leg 1 under a compressive stress for a binding action on the parts to be connected. A similar V-shaped groove 8 is provided in the leg 2 for the same purpose and overhanging lips 9—9 associated with each groove and formed by semi-circular depressions in the side walls retain the filler strip by interlocking engagement with beads or ribbing formations thereon.

The filler strips referred to are indicated at 10—10 in the assembly view Figure 1 and these may also be formed conveniently of molded or extruded rubber but preferably are stiffer or less elastic than the material of the mounting strip inasmuch as they serve primarily as a wedge to hold the strip under a compressive stress. They may be inserted and removed as desired by hand or through the use of special tools designed for the purpose. When inserted the material of the mounting strip is caused to hug tightly the edges of the windowpanes 11 and 12 positioned within the spaced grooves 5 and 6, affording a dead air space between the windows. The stress imposed on the mounting strip also causes it to fit closely to the projecting edge portion or leg 13 as well as the side arms 14—14 of the T-sectioned inner edge of the window frame. The overlapping relation of the grooves 3, 5 and 6 and the fitting thereto of the edges of the windowpane and window frame in overlapping relation affords a secure mounting which resists displacement of the parts with complete insulation and cushioning therebetween. For the purpose of illustration the window frame shown is of hollow section formed by a pair of mating stampings welded or riveted together and to a stationary supporting panel 15. Obviously the invention can be applied with equal facility to a slidable or movable type of window frame.

The use of the mounting is not limited to air conditioned installations and its low cost and cushioning features should make more feasible the installation of double glass in the windshield of automotive passenger cars and trucks in order to avoid misting and insure clear vision. Furthermore, it may be used for mounting other than glass as for example double wall panels and the like.

In the case of a vehicle windshield which has considerable width it is sometimes desirable to divide the same into two or more sections using narrow center bars to join the adjacent edges of the several sections. The situation can be met in various ways, one of which would be to loop the mounting strip in encircling relation with the outer edges of all the sections and to interconnect the adjacent inner edges of the sections by a supplementary strip, such as that illustrated in Figure 3. As a subassembly the opposite ends of the supplementary strip may or may not be vulcanized or otherwise joined at proper points to the main strip.

The supplementary strip indicated at 16 in this instance is formed to substantially rectangularly cross section with a pair of spaced panel receiving channels in each of the opposite sides thereof to receive on one side the edges of the double glass panes 11a and 12a and to receive on the other side the edges of the panes 11b and 12b. These panes incidentally may be of laminated glass as shown. As in the case of the main mounting strip a chanel constricting tendency is produced by placing the rubber under a compressive stress through the insertion of wedging fillers 110—110 located and interlocked within cooperating grooves in the front and rear faces of the strip 16. Thus the strip is formed with a series of peripherally spaced and longitudinally extending recesses, certain of which are for the reception of the wedging fillers subsequent to the reception of the panel edges in the intermediate grooves. It will be apparent that the strip 16 is not limited in its use merely to that of a supplementary device inasmuch as its application could be extended to various installations involving a joint between double panels.

I claim:

1. A connector comprising a body of elastic deformable material of substantially U-shape in section to fit a part to be connected, each leg of said body having a pair of spaced recesses, one to fit a part to be connected and the other to receive a wedging filler.

2. A connector strip comprising a molded body of elastic deformable material having mounting recesses arranged in spaced parallel planes and alternately projected thereinto from opposite faces and wedge receiving recesses in oppositely disposed regions peripherally spaced from the mounting recesses for the reception of spreader strips to stress and resist molecular displacement of the material in the regions of said mounting recesses.

3. In an assembly of the character described, a member having an edge of substantially T-shape in section, a connector strip of elastic deformable material embracing the leg of the T-shaped edge and bearing on the head at both sides thereof, a pair of edge portions fitted within spaced channels of the strip on opposite sides of said leg and a removable filler inserted in each side of the strip to impose a compressive stress on the elastic deformable material.

4. A connector strip of elastic deformable material having a pair of longitudinally extending and transversely spaced mounting channels in one face, a longitudinally extending mounting channel in its opposite face in the region between the first mentioned channels and a wedge receiving recess in each side thereof.

5. A reformable connector strip of the character described, including a pair of spaced legs adapted to lie on opposite sides of the edge portion of a member to be connected, an integral link joining and spacing said legs, a longitudinally extending channel in each leg, said channels being adapted to receive the spaced edge portions of a pair of members to be connected to the first mentioned member, and each leg having a recess to locate a filler for crowding the material of the leg in the region of its channel.

6. In a double window mounting, a window frame having a projecting edge portion, a pair of panes arranged in tandem relation in spaced planes on opposite sides of said edge portion, a rubber mounting strip having a channel in one face receiving said edge portion and a pair of spaced channels in its opposite face receiving the edges of said panes, said strip also having expansible grooves in both sides thereof, and a wedging filler seating in and expanding said groove.

7. In a double window mounting, a window frame having a projecting edge portion, a pair of panes arranged in tandem relation in spaced planes on opposite sides of said edge portion with their edge portions overlapping the frame edge portion, a rubber mounting strip interposed between the frame and panes in overlapping relation to all of said edge portions, and means interlockingly engaging said strip and maintaining the same under stress against displacement.

8. A joint connection for adjacent edges of double panels, comprising a connector strip of elastic deformable material having on each of its opposite sides a pair of spaced panel receiving channels and on the front and rear thereof wedge receiving recesses and wedging fillers insertable in said recesses for placing the material of the strip under a channel restricting stress.

9. A cushion connector comprising a molded rubber strip having panel mounting channels in opposite sides thereof and wedge receiving recesses in the front and rear to decrease resistance to displacement of the rubber in the regions of the channels and thereby facilitate deformation of the strip for the reception of panels within the channels and wedging fillers of a cross sectional area greater than that of the recesses insertable in said recesses for crowding the rubber and thereby increasing resistance to displacement thereof in the regions of the channels.

10. In a device of the character described, a rubber strip formed to substantially rectangular shape in section, said strip having in two faces thereof wedge receiving channels, and in the remaining two faces panel receiving channels, and wedging fillers for reception in the first mentioned channels to stress the strip and produce a constricting tendency at the other channels.

FERDINAND R. EICHNER.